United States Patent Office 3,493,627
Patented Feb. 3, 1970

3,493,627
PROCESS FOR SEPARATING THE INDIVIDUAL
XYLENE ISOMERS FROM XYLENE MIXTURES
Yoshiro Itoh, Tamotsu Ueno, Takashi Nakano, Kazuchika Yamamoto, and Hiromi Nakamura, Niigata-shi, Japan, assignors to Japan Gas-Chemical Company, Inc., Tokyo, Japan, a corporation of Japan
Filed Jan. 3, 1968, Ser. No. 695,459
Claims priority, application Japan, Jan. 20, 1967, 42/3,920; Jan. 21, 1967, 42/4,032
Int. Cl. C07c 7/10; C07b 21/00
U.S. Cl. 260—674                                  7 Claims

ABSTRACT OF THE DISCLOSURE

In a process for separating individual xylene isomers from xylene mixtures containing ethylbenzene according to continuous, multi-stage counter current extraction, the mixtures is contacted with hydrogen fluoride and boron fluoride and a xylene mixture substantially not containing ethylbenzene is refluxed as a reflux xylene. Ethylbenzene is recovered as a reflux raffinate. Resulting extract containing xylene isomers is contacted with a saturated hydrocarbon or saturated hydrocarbon halide, in order to extract o-xylenes and p-xylenes so that the m-xylene is left in the hydrogen fluoride.

---

The present invention relates to a process for separating the individual xylene isomers from xylene mixtures.

It has been known that generally xylene isomer X reacts with hydrogen fluoride, and boron fluoride, thereby to form such complex as having the following formula;

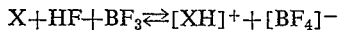

$$X + HF + BF_3 \rightleftarrows [XH]^+ + [BF_4]^-$$

Equilibrium constants of the reaction represented by the above-identified formula are called basicities, and they decrease in order of m-xylene>o-xylene>p-xylene>ethylbenzene. The present inventors have carried out extensive studies in a method of separating the individual xylene isomers from xylene mixtures by utilizing the aforesaid characteristics of xylene isomers. As a result, they have found a process for separating only ethylbenzene from the xylene mixtures, which has the lowest basicity among the individual xylene isomers as mentioned above. This object can be accomplished by cyclically employing the xylene mixtures substantially not containing ethylbenzene as a reflux xylene.

In the above case, it is particularly desirable to use an isomerization product obtained by subjecting m-xylene, which is subject to restriction in the uses thereof among the xylene isomers, to isomerization reaction using HF and $BF_3$ as catalysts. Such isomerization product obtained as above does not substantially contain ethylbenzene. Alternatively, there may be used the xylene mixtures obtained in accordance with the process of the present invention by remaining only ethylbenzene as a residual extract, extracting the individual xylene isomers having higher basicities than that of ethylbenzene as a complex thereof with an extracting agent consisting of hydrogen fluoride and boron fluoride, cracking the thus extracted complex solution in a cracking column to exclude the hydrogen fluoride and boron fluoride therefrom.

Figure 1:
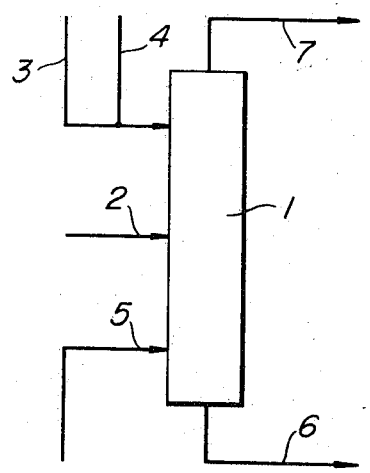

The process of the present invention is explained below by referring to the accompanying drawings. In FIG. 1, 1 represents an extraction column, and a starting xylene mixture is fed through 2 into the central portion of the column. Hydrogen fluoride and boron fluoride are fed from the column head respectively through 3 and 4, and a xylene mixture substantially not containing ethylbenzene as a reflux xylene is fed from the column bottom through 5.

Thus, by continuously and countercurrently contacting xylene mixture with HF and $BF_3$, the xylene isomers other than ethylbenzene are extracted into HF phase and are withdrawn through 6 at the column bottom as a complex solution, and the ethylbenzene is withdrawn as raffinate through 7 at the column head. The raffinate thus withdrawn contains slight amounts of hydrogen fluoride, boron fluoride, and benzene, toluene and a slight amount of saturated hydrocarbon, but these components are readily separated therefrom by distillation.

In the process of the present invention, addition amounts of hydrogen fluoride and of boron fluoride per mole of xylene charging stock are 50–5 moles and 3–0.5 mole, respectively. Furthermore, an addition amount of reflux xylene per mole of xylene charging stock is 5–0.5 mole. Extraction temperature is suitably employed at +20° C.—−50° C., preferably 0°–30° C. Pressure to be applied thereof is 1–20 kg./cm.²

Further, the present inventors have found the fact that generally when a saturated hydrocarbon or saturated hydrocarbon halide is in contact with a hydrogen fluoride-boron fluoride complex solution of xylene mixtures containing two or more kinds of xylene isomers, a xylene isomer having low basicity of the individual xylene isomers constituting the complex is back extracted into the side of the saturated hydrocarbon or saturated hydrocarbon halide, while the xylene isomers having high basicity remain in the side of the hydrogen fluoride extract.

As the saturated hydrocarbons used in this case, there may be used such hydrocarbons as having 4 or more carbon atoms and being maintained as liquid phase under normal pressure, preferably those as having 4–6 carbon atoms. These saturated hydrocarbons include, for example, such as n-butane, i-butane, n-pentane, i-pentane, n-hexane and i-hexane. However, other saturated hydrocarbons than the above-mentioned may be used depending on the selection of temperature and pressure. As the saturated hydrocarbon halides, carbon tetrachloride and the like may be used. Extraction temperature is suitably employed at the range of from −50° to +20° C., preferably from −30° to +10° C. Pressure to be employed is 1–20 kg./cm.² Furthermore, the amount of saturated hydrocarbon being 0.1–20 moles per mole of the dissolved xylene isomers in the complex phase is suitable for practical purposes.

Figure 2:
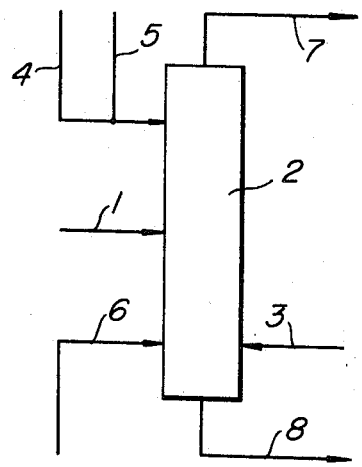
Figure 3:
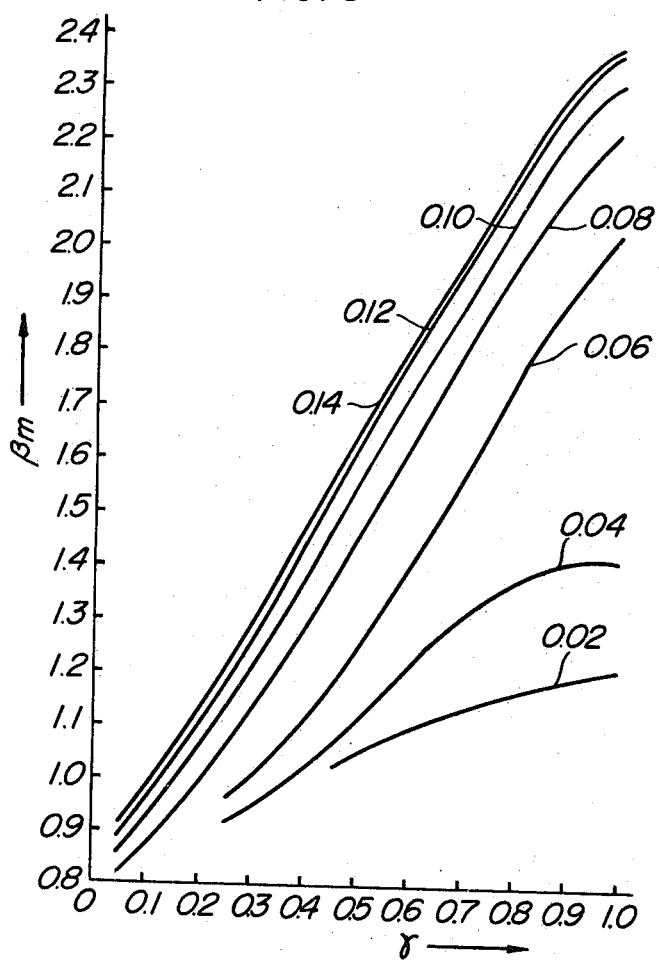

The process of the present invention is explained below by referring to the accompanying drawings. In FIG. 2, a hydrogen fluoride-boron fluoride complex solution of the zylene isomers is introduced into the central portion of a multi-stage counter current extraction apparatus 2 through 1. Saturated hydrocarbon is injected from the column bottom through 3, and hydrogen fluoride and boron fluoride are fed respectively from the column head through 4 and 5 to effect continuous counter current extraction. Furthermore, the xylene isomers having a high basicity, which must be remained in the hydrogen fluoride phase, are refluxed through 6. In this case, the object of feeding thereinto the hydrogen fluoride and boron fluoride is to replenish the shortage to make the necessary amount thereof so that the reflux xylene isomers may form the complex. Hereon, in the case where only m-xylene is remained in the extract, the relation between the dilution ratio and ratio of m-xylene/boron fluoride at a temperature of 0° C. is shown in FIG. 3, wherein $\beta_m$=m-xylene in HF extract/$BF_3$ in HF extract, and $\gamma$=xylene in hydrocarbon phase/xylene in hydrocarbon phase+ diluting agent in hydrocarbon phase. Furthermore, parameter represents a molar ratio of $BF_3$/HF. That is, the addition amounts of hydrogen fluoride and boron fluoride must be fed in such a condition that the relation as shown in FIG. 3 may substantially be satisfied at the withdrawing portion of hydrogen fluoride phase. Thus, the hydrocarbon having a low basicity in the complex solution is extracted with saturated hydrocarbon and is then withdrawn from the column head through 7, which is further subjected to separation by distillation. The hydrogen fluoride phase withdrawn from the column head which retains therein hydrocarbons having a high basicity is then fed into a complex decomposing column. When carbon tetrachloride and the like is used as an extracting agent, the direction of liquid stream is reversed upside-down.

Figure 4:
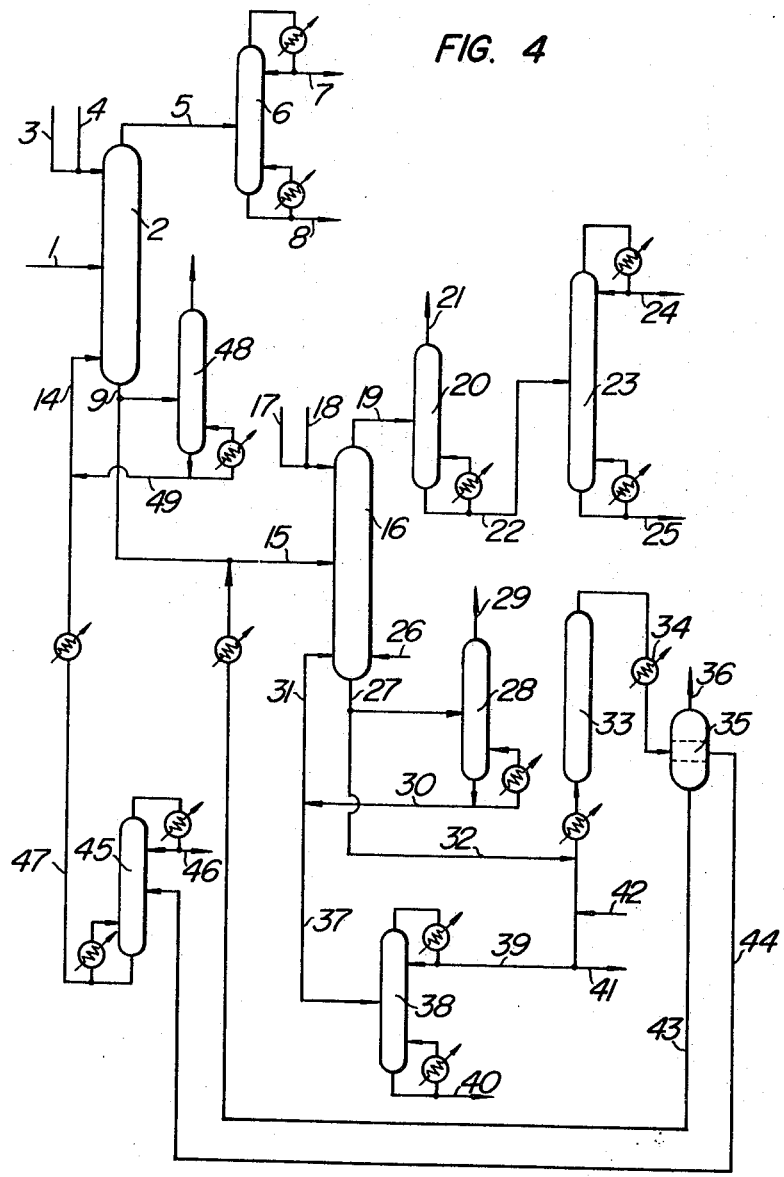

In accordance with the present invention, it is possible to separate the individual xylene isomers with high purity from the xylene mixtures, respectively. In FIG. 4, the starting xylene mixtures containing m-xylene, o-xylene, p-xylene and ethylbenzene is fed into the central portion of the first extraction column (an ethylbenzene recovery column) 2 through pipe 1. Hydrogen fluoride and boron fluoride are fed respectively from the column head through pipes 3 and 4, and the xylene mixtures substantially not containing ethylbenzene is refluxed from the column bottom through pipe 14. By feeding thereinto the respective amounts of hydrogen fluoride and boron fluoride calculated, m-xylene, o-xylene, and p-xylene are extracted into the hydrogen fluoride phase and are then withdrawn through the column bottom pipe 9, and ethylbenzene as raffinate is withdrawn from the column head through pipe 5. Raffinate is fed into a distillation column 6 for the purpose of removing slight amounts of hydrogen fluoride, boron fluoride, and of benzene, toluene and of saturated hydrocarbon which have been occluded slightly-thereinto, and these components are separated off through the column head. Ethylbenzene is withdrawn through the column bottom pipe 8. The extract withdrawn from the column bottom of the first extraction column is fed as such, without being decomposed, into the second extraction column 16 through pipe 15. The calculated amounts of hydrogen fluoride and boron fluoride covering the shortages thereof are fed from the column head of the second extraction column through pipes 17 and 18, and reflux m-xylene is fed through the column bottom pipe 26. From the column head pipe 19, o-xylene, p-xylene and the saturated hydrocarbon fed through 26 are withdrawn as raffinate. The raffinate are fed to distillation column 20, and slight amounts of hydrogen fluoride, boron fluoride, and of benzene, toluene and saturated hydrocarbon are removed. o-Xylene and p-xylene are forwarded to a distillation column 23 through pipe 22, where they are subjected to distillation. From the column head pipe 24, p-xylene is obtained, and from the column bottom pipe 25, o-xylene is obtained.

The extract withdrawn from the column bottom of the second extraction column through pipe 27 contains m-xylene, and this extract is forwarded to a decomposing column 28 to decompose the complex. m-Xylene is withdrawn from the column bottom, a part of which is passed through 30 and 31 to be used as a reflux in the second extraction column 16. Furthermore, a remainder of which is forwarded to a high boiling material separation column 38 through pipe 37, whereby high boiling by-products are removed therefrom. The product m-xylene is withdrawn from 41 and the remainder is forwarded to an isomerization reactor 33. Simultaneously, the hydrogen fluoride extract withdrawn from the second extraction column bottom through 32 is fed thereinto as a catalyst for the isomerization reaction. As a side-reaction inhibitor of isomerization reaction, saturated hydrocarbon (the same one as that fed through 26) is fed thereinto through pipe 42. The reaction product from the reactor 33 is cooled with a cooler 34 and is separated in a separator 35 in the order of hydrogen fluoride phase, xylene phase and gas phase from below. The hydrogen fluoride phase is circulated toward the second extraction column 16 through pipe 43. Furthermore, the isomerized xylene phase is forwarded into an isomerization inhibitor separation column 45 through pipe 44 to separate the inhibitor off at the column head. The isomerized xylene obtained from the column bottom does not substantially contain ethylbenzene, and therefore it is passed through pipe 47 and used as a reflux xylene of the first extraction column 2. Alternatively, as the reflux xylene of the first extraction column, the xylene mixture not containing ethylbenzene, which is obtained by forwarding the extract from the first extraction column into a decomposing column 48 and decomposing said complex thereof, may be used.

Thus, in accordance with the process of the present invention, the separation of ethylbenzene from the xylene mixtures can be carried out by comparatively simple operations without relying on super fractionating distillation, and not only the isomerization product of m-xylene can effectively be utilized but also, particularly, the process of decomposing the complex can completely be omitted by directly contacting the remaining hydrogen fluoride-boron fluoride complex solution, from which ethylbenzene has been removed, with saturated hydrocarbon or saturated hydrocarbon halide. Accordingly, it is possible to economize an apparatus necessary for the decomposing process, energy required for decomposing, etc., and to the effect the separate of the individual xylene isomers, which results in very large effect.

The following examples are given as illustrative, but they are construed by no means as limiting.

EXAMPLE 1

With RDC tower (a rotary disc contactor) having 100 stages, ethylbenzene was separated according to such a flowsheet as shown in FIG. 1. In this case, extraction temperature and pressure employed therefor were −25° C. and 5 ata., respectively. Flow amounts of the liquid streams at the individual portions of the contactor were as shown in the following Table 1.

TABLE 1

| | Unit of flow amount, mole/hr. | | | | |
|---|---|---|---|---|---|
| | Starting material charged | Reflux xylene | Extracting agent | Extract | Raffinate |
| Benzene | 0 | 0.8 | | 0 | 1.5 |
| Toluene | 0.1 | 0.2 | | 0 | 0.3 |
| Ethylbenzene | 25.3 | 0.1 | | 0.1 | 24.6 |
| p-Xylene | 18.1 | 27.0 | | 44.6 | 0.05 |
| m-Xylene | 43.5 | 64.5 | | 108.4 | 0 |
| o-Xylene | 13.1 | 21.2 | | 33.6 | 0 |
| Hydrocarbon having C$_9$ or more | 0 | 0 | | 0.7 | 0 |
| Hydrogen fluoride | | | 980 | 979.9 | 0.1 |
| Boron fluoride | | | 98.5 | 98.4 | 0.1 |

EXAMPLE 2

637 parts of a complex solution having such a composition as shown in Table 2–A was poured in a reactor equipped with a stirrer, to which 121 parts of n-hexane was added and mixed therewith. After stirring, the mixture was allowed to settle into two layers. Hydrocarbon phase of the upper layer and hydrogen fluoride phase of the lower layer were analyzed to obtain the results as shown in B and C of Table 2, respectively. As can be seen from these results, it is apparent that p-xylene and o-xylene have been extracted respectively to remain in the hydrocarbon phase.

TABLE 2

|  | Before addition of hexane, starting complex | After addition of hexane | |
|---|---|---|---|
|  |  | Hydrocarbon phase | Hydrogen fluoride phase |
|  | A | B | C |
| p-Xylene | 14 | 11.0 | 3.0 |
| o-Xylene | 23 | 14.1 | 8.9 |
| m-Xylene | 28 | 2.0 | 26.0 |
| 1,2,4-trimethylbenzene | 35 | 0.8 | 34.2 |
| Hydrogen fluoride | 485 | 0.5 | 484.5 |
| Boron fluoride | 52 | 0.1 | 51.9 |
| N-hexane | | 120 | 1.0 |
| Total | 637 | 148.5 | 609.5 |

EXAMPLE 3

659 parts of a complex solution having such a composition as shown in A of Table 3 was poured in the same reactor as in Example 2, to which 191 parts of n-hexane was added. After stirring, the mixture was allowed to stand stationarily to obtain two layers respectively consisting of such compositions as shown in B and C of Table 3.

TABLE 3

|  | Before addition of hexane, starting complex | After addition of hexane | |
|---|---|---|---|
|  |  | Hydrocarbon phase | Hydrogen fluoride phase |
|  | C | B | C |
| Toluene | 3 | 2.9 | 0.1 |
| Ethylbenzene | 18 | 14.7 | 3.3 |
| p-Xylene | 20 | 12.9 | 7.1 |
| o-Xylene | 19 | 6.6 | 12.4 |
| m-Xylene | 40 | 2.3 | 37.7 |
| Hydrogen fluoride | 505 | 0.5 | 504.5 |
| Boron fluoride | 54 | 0.1 | 53.9 |
| n-Hexane | | 190 | 1.2 |
| Total | 659 | 230.0 | 620.2 |

EXAMPLE 4

758 mole/hr. of a complex solution having such a composition as shown in A of Table 4 was introduced into the central portion of a multi-stage counter current extraction apparatus. 50 mole/hr. of n-pentane and 66 mole/hr. of reflux m-xylene (98.5% purity) were injected thereinto from the column bottom of the apparatus. Furthermore, 410 mole/hr. of hydrogen fluoride and 42 mole/hr. of boron fluoride were blown thereinto from the column head, and continuous counter current extraction was then effected. 93.5 mole/hr. of hydrocarbon (its composition shown in B of Table 4) was withdrawn from the column head and 1232.3 mole/hr. of hydrogen fluoride (its composition shown in C of Table 4) was withdrawn from the column bottom.

TABLE 4

|  | Complex solution charged into extraction apparatus | Hydrocarbon phase withdrawn from column head | Hydrogen fluoride phase withdrawn from column bottom |
|---|---|---|---|
|  | A | B | C |
| p-Xylene | 23 | 22.6 | 0.7 |
| o-Xylene | 21 | 20.2 | 1.5 |
| m-Xylene | 56 | 0.3 | 120.7 |
| Hydrogen fluoride | 600 | 0.8 | 1009 |
| Boron fluoride | 58 | 0.1 | 99.9 |
| n-Pentane | | 49.5 | 0.5 |
| Total | 758 | 93.5 | 1232.3 |

EXAMPLE 5

Operations were carried out according to such a flowsheet as shown in FIG. 4 under the same conditions as in Example 1. Flow amounts of liquid streams at each portion of the columns were shown in Table 5. The numbers of individual portions of the contractor coincide with those as shown in FIG. 4.

TABLE 5

| Unit of amount of liquid stream, mole/hr. | | | | | | | | | | | |
|---|---|---|---|---|---|---|---|---|---|---|---|
|  | 1 | 14 | 3 & 4 | 9 | 5 | 43 | 15 | 3 & 26 | 17 & 18 | 19 | 27 |
| n-Hexane | 0 | | | | | 1.5 | 1.5 | 150 | | 151 | 0.5 |
| Benzene | 0 | 0.2 | | 0 | 1.7 | 0 | 0 | 0 | | | |
| Toluene | 0.2 | 0.1 | | 0 | 0.3 | | 0 | 0 | | | |
| Ethylbenzene | 21.7 | 0.1 | | 0.1 | 20.1 | | 0 1. | 0.1 | | 0.1 | 0 |
| p-Xylene | 18.5 | 28.4 | | 46.6 | 0.05 | 5.1 | 51.7 | 1.0 | | 50.5 | 2.2 |
| m-Xylene | 47.1 | 72.8 | | 119.9 | 0 | 50.3 | 170.2 | 180 | | 0.1 | 350.1 |
| o-Xylene | 15.2 | 23.0 | | 37.0 | 0 | 4.8 | 41.8 | 0.8 | | 39.7 | 2.9 |
| Hydrocarbon of $C_9$ or more | 0 | 0.1 | | 1.0 | 0 | 0.3 | 1.3 | 0.2 | | 0 | 1.5 |
| Hydrogen fluoride | | | 1,230 | 1,229.7 | 0.3 | 602 | 1,831.9 | | 1,150 | 1.0 | 2,980.9 |
| Boron fluoride | | | 115 | 114.9 | 0.1 | 59 | 173.9 | | 110 | 0.4 | 283.5 |

What is claimed is:

1. In a process for separating individual xylene isomers from xylene mixtures, the process for recovering ethylbenzene from said xylene mixtures characterized by contacting xylene mixtures containing ethylbenzene and one or more other xylene isomers selected from the group consisting of m-xylene, p-xylene and o-xylene with an extracting agent consisting of hydrogen fluoride and boron fluoride, and refluxing a xylene mixture containing substantially no ethylbenzene as reflux xylene.

2. A process according to claim 1, wherein the reflux xylene is an isomerization reaction product of m-xylene.

3. A process according to claim 1, wherein the amounts of hydrogen fluoride and boron fluoride to be added are 50–5 moles and 3–.05 mole per mole of the starting xylene mixtures, respectively.

4. In a process for separating individual xylene isomers from xylene mixtures, the process for separating m-xylene from said xylene mixtures characterized by contacting a hydrogen fluoride-boron fluoride complex solution of xylene mixtures containing m-xylene and one or more xylene isomers selected from the group consisting of p-xylene, o-xylene and ethylbenzene with a saturated hydrocarbon or saturated hydrocarbon halide and back extracting xylene isomers other than m-xylene into the hydrocarbon phase to retain only m-xylene in the hydrogen fluoride phase.

5. A process according to claim 4, wherein the saturated hydrocarbon is selected from n-butane, i-butane, n-pentane, i-pentane, n-hexane and i-hexane.

6. In a process for separating the individual xylene isomers from xylene mixtures according to continuous, multi-stage counter current extraction, the process for separating the individual xylene isomers from the xylene mixtures chraacterized by contacting the xylene mixtures containing ethylbenzene, p-xylene, o-xylene and m-xylene with an extracting agent consisting of hydrogen fluoride and boron fluoride, refluxing a xylene mixture substantially not containing ethylbenzene as a reflux xylene to recover the ethylbenzene as raffinate, contacting the resulting extract as such without being decomposed with a saturated hydrocarbon or saturated hydrocarbon halide, and back extracting p-xylene and o-xylene present in the extract to retain only m-xylene in the hydrogen fluoride phase.

7. A process according to claim 6, wherein the reflux xylene is an isomerization reaction product of m-xylene.

References Cited

UNITED STATES PATENTS

| | | | |
|---|---|---|---|
| 2,768,220 | 10/1956 | Nixon et al. | 260—674 |
| 2,780,659 | 2/1957 | McCaulay et al. | 260—674 XR |
| 2,835,714 | 5/1958 | Nixon et al. | 260—674 |
| 2,848,518 | 8/1958 | Fragen | 260—674 |

DELBERT E. GANTZ, Primary Examiner

C. R. DAVIS, Assistant Examiner